United States Patent
Hanada

(10) Patent No.: US 10,127,910 B2
(45) Date of Patent: Nov. 13, 2018

(54) SPEECH RECOGNITION APPARATUS AND COMPUTER PROGRAM PRODUCT FOR SPEECH RECOGNITION

(71) Applicant: DENSO CORPORATION, Kariya, Aichi-pref. (JP)

(72) Inventor: Syunpei Hanada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/105,061

(22) PCT Filed: Dec. 11, 2014

(86) PCT No.: PCT/JP2014/006168
§ 371 (c)(1),
(2) Date: Jun. 16, 2016

(87) PCT Pub. No.: WO2015/093013
PCT Pub. Date: Jun. 25, 2015

(65) Prior Publication Data
US 2016/0314787 A1    Oct. 27, 2016

(30) Foreign Application Priority Data
Dec. 19, 2013   (JP) .................. 2013-262482

(51) Int. Cl.
*G10L 15/22*    (2006.01)
*G10L 21/02*    (2013.01)
(Continued)

(52) U.S. Cl.
CPC .......... *G10L 15/222* (2013.01); *G10L 17/22* (2013.01); *G10L 21/02* (2013.01); *G10L 21/0308* (2013.01); *G10L 15/20* (2013.01)

(58) Field of Classification Search
CPC .... G10L 15/222; G10L 21/02; G10L 21/0308
See application file for complete search history.

(56) References Cited

U.S. PATENT DOCUMENTS 5,765,130 A * 6/1998 Nguyen .................. G10L 25/78
704/231
6,574,595 B1 * 6/2003 Mitchell ................. G10L 15/22
704/242
(Continued)

FOREIGN PATENT DOCUMENTS

JP    2000200099 A    7/2000
JP    2004109779 A    4/2004
(Continued)

*Primary Examiner* — Samuel G Neway
(74) *Attorney, Agent, or Firm* — Harness, Dickey & Pierce, P.L.C.

(57) ABSTRACT

In a speech recognition apparatus, a speech driver fetches a guidance speech-data as a reference speech-data, and outputs the reference speech-data to a recognition core unit. A guidance speech into which the guidance speech-data is converted is outputted by a speaker to cause a microphone to receive the outputted guidance speech, which will be converted into an inputted guidance speech-data. Even in such case, a speech recognition engine removes the inputted guidance speech-data by using, as the reference speech-data, the guidance speech-data that is before being converted into the outputted guidance speech.

7 Claims, 5 Drawing Sheets

(51) Int. Cl.
*G10L 21/0308* (2013.01)
*G10L 17/22* (2013.01)
*G10L 15/20* (2006.01)

(56) References Cited

U.S. PATENT DOCUMENTS

| | | | | |
|---|---|---|---|---|
| 6,694,018 | B1* | 2/2004 | Omori | H04M 9/082 |
| | | | | 379/388.02 |
| 6,882,973 | B1* | 4/2005 | Pickering | G10L 15/22 |
| | | | | 379/88.02 |
| 7,437,286 | B2* | 10/2008 | Pi | G01S 13/66 |
| | | | | 704/233 |
| 2003/0083874 | A1* | 5/2003 | Crane | G10L 15/22 |
| | | | | 704/246 |
| 2005/0060149 | A1* | 3/2005 | Guduru | G10L 25/78 |
| | | | | 704/233 |
| 2009/0254342 | A1* | 10/2009 | Buck | G10L 15/222 |
| | | | | 704/233 |
| 2010/0246849 | A1* | 9/2010 | Sudo | H03G 3/32 |
| | | | | 381/94.1 |
| 2011/0238417 | A1* | 9/2011 | Yamamoto | G10L 25/78 |
| | | | | 704/233 |
| 2011/0246190 | A1 | 10/2011 | Suzuki et al. | |
| 2016/0314787 | A1* | 10/2016 | Hanada | G10L 17/22 |

FOREIGN PATENT DOCUMENTS

| | | | |
|---|---|---|---|
| JP | 2007292814 | A | 11/2007 |
| JP | 2009025714 | A | 2/2009 |
| JP | 2011203700 | A | 10/2011 |
| JP | 2011215421 | A | 10/2011 |
| JP | 2012181561 | A | 9/2012 |

* cited by examiner

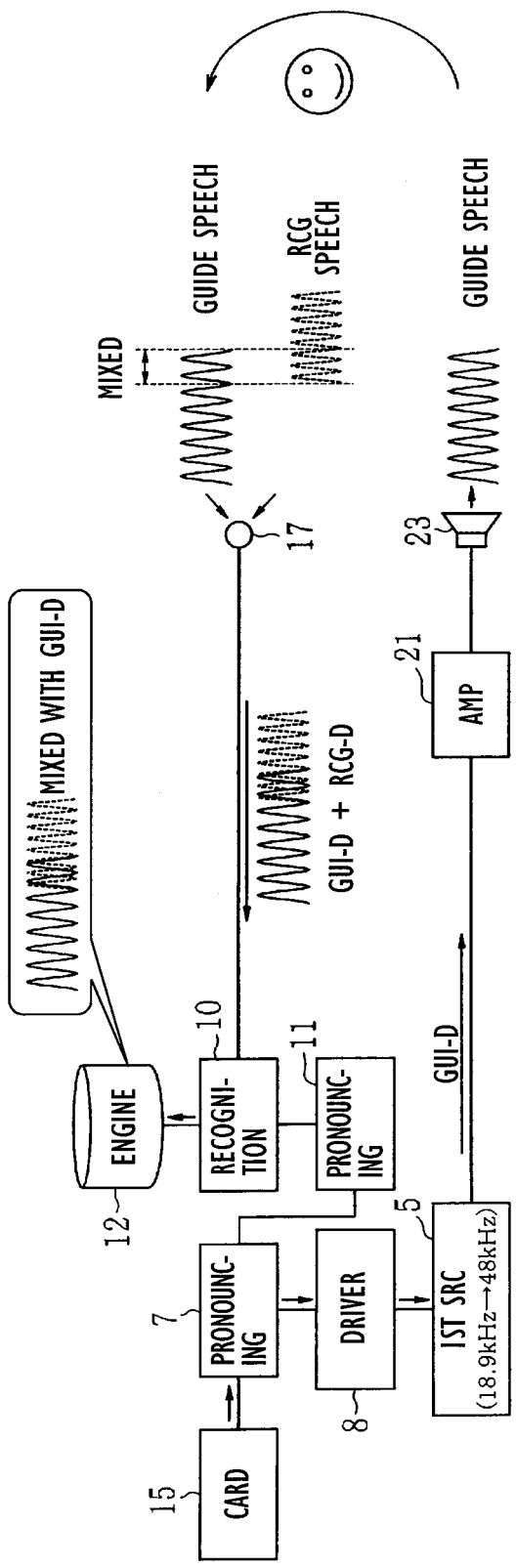
FIG. 4A NOT INPUT REF-D (COMPARATIVE EXAMPLE)

SPEECH RECOGNITION APPARATUS AND COMPUTER PROGRAM PRODUCT FOR SPEECH RECOGNITION

CROSS REFERENCE TO RELATED APPLICATIONAPPLICATIONS

This application is a U.S. National Phase Application under 35 U.S.C. 371 of International Application No. PCT/JP2014/006168 filed on Dec. 11, 2014 and published in Japanese as WO 2015/093013A1 on Jun. 25, 2015. This application is based on and claims the benefit of priority from Japanese Patent Application No.2013-262482 filed on Dec. 19, 2013. The entire disclosures of all of the above applications are incorporated herein by reference.

TECHNICAL FIELD

The present disclosure relates to a speech recognition apparatus that performs speech recognition by converting recognition speech into speech-data, the recognition speech being a speech for recognition uttered by a user while a guidance speech is outputted, and further relates to a computer program product for speech recognition.

BACKGROUND ART

There is known a barge-in function as a technique to perform a correct speech recognition. While a guidance speech such as "please speak at the tone" is outputted, a user may utter a recognition speech such as "drive home." Even in such a case, the barge-in function performs a correct speech recognition of the recognition speech. In detail, a guidance speech inputted into a speaker at the same time when a user utters a recognition speech is removed; the recognition rate of recognition speech-data is prevented from decreasing. A conventional configuration achieving a barge-in function includes an additional microphone in addition to a microphone for input of recognition speech uttered by a user. This configuration uses a guidance speech inputted into the additional microphone as a reference speech that removes a guidance speech inputted into the microphone for input of recognition speech (for example, refer to Patent literatures 1 and 2).

PRIOR ART LITERATURES

Patent Literature

Patent literature 1: JP 2004-109779 A
Patent literature 2: JP 2009-025714 A

SUMMARY OF INVENTION

Such configuration, which need include an additional microphone for input of reference speech to remove a guidance speech, involves high costs and complexity.

It is an object of the present disclosure to provide a speech recognition apparatus and a computer program product for speech recognition, which prevent decline in recognition rate of recognition speech-data without need of another speech input device in addition to a speech input device to input recognition speech uttered by a user.

An example of the present disclosure is provided as follows. A speech output device converts a guidance speech-data outputted from a guidance speech-data output device into an outputted guidance speech, and outputs (pronounces) the outputted guidance speech to be audibly perceptible. A speech input device receives an inputted speech and converts the inputted speech into an inputted speech-data. A speech-data input device receives the inputted speech-data. A speech recognition device applies a speech recognition to a recognition speech-data, which is a speech-data of a recognition speech uttered by a user and is used in recognition, when the recognition speech uttered by the user is received by the speech input device so that the recognition speech-data is received by the speech-data input device. Here, the speech-data input device receives the guidance speech-data outputted from the guidance speech-data output device as a reference speech-data. When the outputted guidance speech audibly outputted by the speech output device is received by the speech input device so that an inputted guidance speech-data is received by the speech-data input device, the speech recognition device performs a process that removes the inputted guidance speech-data using the reference speech-data received by the speech-data input device.

That is, the guidance speech-data before being converted into the guidance speech is used as a reference speech-data. Even when the guidance speech outputted from the speech output device is inputted into the speech input device, the guidance speech-data into which the guidance speech is converted is removed using the reference speech-data. This configuration does not need another speech input device in addition to the speech input device that receives a recognition speech uttered by a user, and prevents the decline in the recognition rate of the recognition speech-data even when the recognition speech is uttered by the user while the guidance speech is outputted.

BRIEF DESCRIPTION OF DRAWINGS

The above and other objects, features and advantages of the present disclosure will become more apparent from the following detailed description made with reference to the accompanying drawings. In the drawings:

FIG. 4A is a diagram illustrating a comparative example which removes a guidance speech-data.

EMBODIMENTS FOR CARRYING OUT INVENTION

Figure 1:
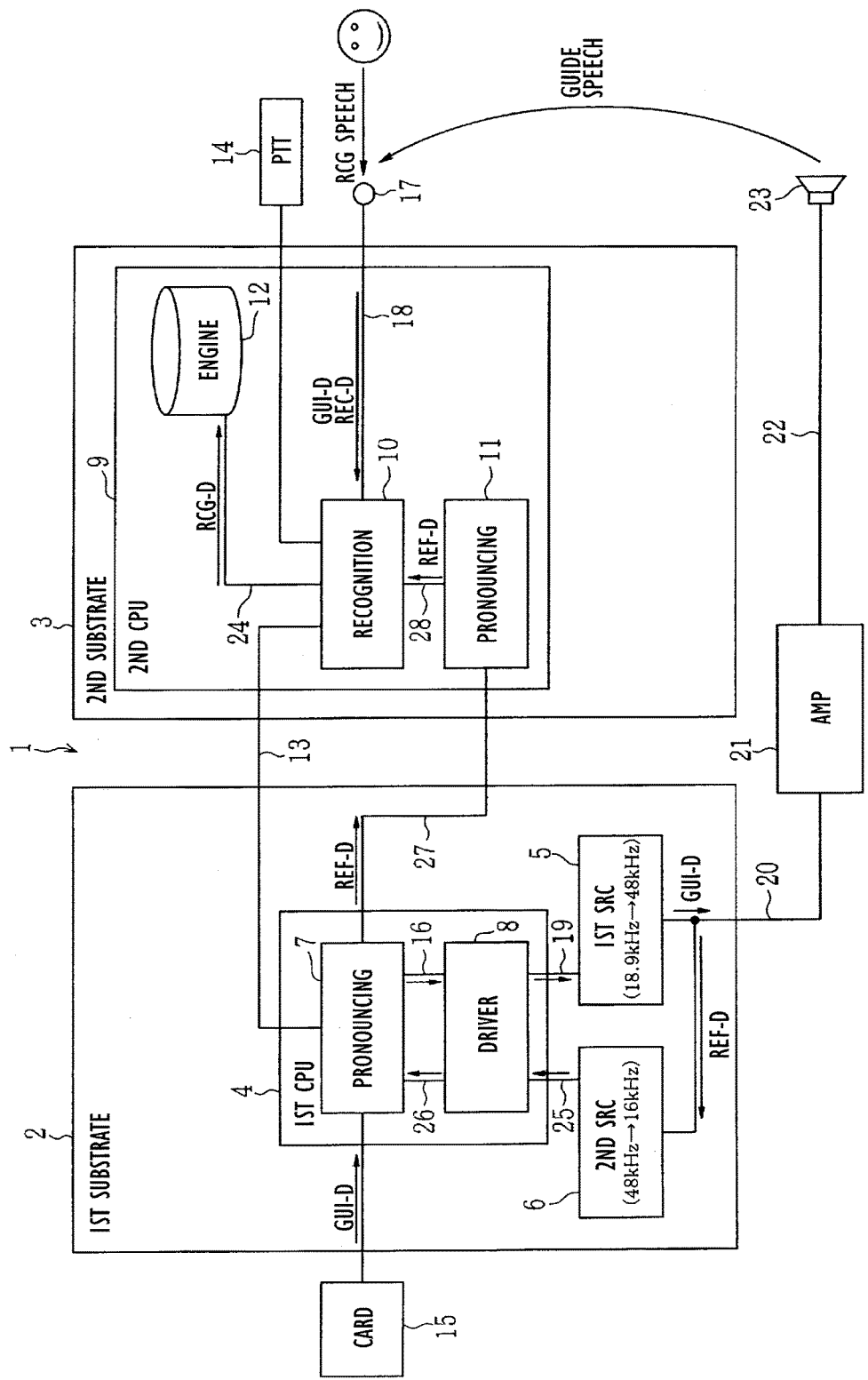
FIG. 1 is a functional block diagram according to a first embodiment of the present invention.

The following explains an embodiment where the present disclosure is applied to a speech recognition apparatus that is able to be mounted in a vehicle, with reference to the drawings. The speech recognition apparatus 1 for vehicles, which can be mounted in vehicles, includes a first substrate 2 and a second substrate 3. Being able to be mounted in a vehicle signifies either an example where the apparatus is fixedly mounted in a vehicle, or an example where the apparatus is detachably mounted in a vehicle. The first substrate 2 is mounted with a first CPU (Central Processing Unit) 4, a first sampling rate conversion (SRC) circuit 5, and a second sampling rate conversion (SRC) circuit 6 (i.e., sampling rate conversion device). The sampling rate may be a sampling frequency. The first CPU 4 includes a control unit that controls an entity, an arithmetic unit that executes various computations, a register that stores data temporarily, an oscillator that oscillates a clock, and a communication interface that communicates with a second CPU 9 to be mentioned later. The first CPU 4 includes a pronouncing core unit 7, and a speech driver 8 (guidance speech-data output device). Each device of the pronouncing core unit 7 and the speech driver 8 is achieved by the first CPU 4 executing a control program (software), as an example of the present embodiment; in contrast, part or all of each device may be achieved by hardware components.

In the drawings, the reference speech-data is referred to as "REF-D", the guidance speech-data is referred to as "GUI-D", the guidance speech is referred to as "GUIDE SPEECH", the recognition speech-data is referred to as "RCG-D", and the recognition speech is referred to as "RCG SPEECH."

The second substrate 3 is mounted with a second CPU 9 (control circuit). The second CPU 9 includes a control unit that controls an entity, an arithmetic unit that executes various computations, a register that stores data temporarily, an oscillator that oscillates a clock, and a communication interface that communicates with the first CPU 4 mentioned above. Moreover, the second CPU 9 includes a recognition core unit (speech recognition core unit) 10 (i.e., speech-data input device), a pronouncing core unit 11, and a speech recognition engine 12 (i.e., speech recognition device). Each of the recognition core unit 10, the pronouncing core unit 11, and the speech recognition engine 12 is achieved by the second CPU 9 executing a control program (software containing a computer program for speech recognition). Moreover, the recognition core unit 10 in the second substrate 3 and the pronouncing core unit 7 in the first substrate 2 are connected with each other via a control line 13. The recognition core unit 10 and the pronouncing core unit 7 communicate various kinds of control signals (requests or responses) via the control line 13.

A PTT (Push to Talk) button 14 is able to be pressed by a user to start (activate) speech recognition function; when the user presses the button, a detection signal is outputted to the recognition core unit 10. Upon receiving the detection signal from the PTT button 14, the recognition core unit 10 determines that the user has started the speech recognition function, and outputs a reproduction start request to the pronouncing core unit 7 via the control line 13.

An SD card 15 stores and holds various kinds of speech-data, which include a guidance speech-data (for example, an original data of a guidance speech of "please speak at the tone"). Upon receiving the reproduction start request from the recognition core unit 10, the pronouncing core unit 7 reads the guidance speech-data from the SD card 15, and outputs (sets) the read guidance speech-data to the speech driver 8 via the speech-data line 16. Such a guidance speech-data read from the SD card 15 into the pronouncing core unit 7 has a sampling rate of 18.9 [kHz], for instance.

At the same time of outputting the read guidance speech-data to the speech driver 8 via the speech-data line 16, the pronouncing core unit 7 outputs a microphone ON request to the recognition core unit 10 via the control line 13. Upon receiving the microphone ON request, the recognition core unit 10 outputs an activation signal to a microphone 17 (speech input device). Upon receiving the activation signal from the recognition core unit 10, the microphone 17 is activated. The microphone 17 having been activated waits for an input (sound collection) of a speech to be uttered by the user. Upon receiving (i.e., hearing) the speech uttered by the user, the microphone 17 converts the received speech into speech-data (electrical signal), and outputs the speech-data to the recognition core unit 10 via the speech-data line 18.

The speech driver 8 receives the guidance speech-data from the pronouncing core unit 7; the speech driver 8 thereby outputs the received guidance speech-data to the first SRC circuit 5 via the speech-data line 19. Upon receiving the guidance speech-data from the speech driver 8, the first SRC circuit 5 converts the sampling rate of the received guidance speech-data from 18.9 [kHz] into 48 [kHz]. The first SRC circuit 5 outputs the guidance speech-data, the sampling rate of which is converted, to the amplifier 21 via the speech-data line 20.

Upon receiving the guidance speech-data from the first SRC circuit 5, the amplifier 21 amplifies the received guidance speech-data according to a predetermined amplification rate, and outputs the amplified guidance speech-data to the speaker 23 (speech output device) via the speech-data line 22. Upon receiving the guidance speech-data from the amplifier 21, the speaker 23 converts the received guidance speech-data into a guidance speech (audible sound), and outputs the guidance speech. Under the above configuration, the user's pressing the PTT button 14 causes the speaker 23 to start to output the guidance speech (i.e., to pronounce the guidance speech) to be audibly perceptible.

When the user utters a recognition speech for recognition (for example, "drive back home"), the microphone 17 receives (hears) the recognition speech uttered by the user and thereby converts the received recognition speech into a speech-data. The microphone 17 then outputs the recognition speech-data to the recognition core unit 10 via the speech-data line 18. Upon receiving the recognition speech-data from the microphone 17, the recognition core unit 10 outputs the received recognition speech-data to the speech recognition engine 12 via the speech-data line 24. Here, a guidance speech-data received by the recognition core unit 10 from the microphone 17 has a sampling rate of 16 [kHz], for instance.

Upon receiving the speech-data from the recognition core unit 10, the speech recognition engine 12 applies a known speech recognition process to the received speech-data, thereby acquiring a speech recognition result relative to the received speech-data. The speech recognition process includes a process that extracts a feature from a speech-data, a process that converts a speech-data into phonemes, a process that converts a phoneme string into a word using recognition dictionaries, and a process that outputs as a text the candidate that has the highest validity among the candidates of words into which the phoneme string is converted. The speech recognition result acquired by the speech recognition engine 12 may be used for a process that designates a destination in a navigation function. Under the above configuration, following the user's uttering "drive back home" as a recognition speech, the speech recognition engine 12 correctly performs the speech recognition of the recognition speech-data; this designates the position of the home previously registered in a navigation system (unshown) as a destination.

The limited space of a vehicle compartment gives a physical difficulty in that the microphone 17 and the speaker 23 are significantly separate from each other. This may cause the guidance speech outputted from the speaker 23 to enter (run round to) the microphone 17. Here, if the user using the speech recognition function utters a recognition speech after the output of the guidance speech from the speaker 23 is completed, the period for which the guidance speech is inputted into the microphone 17, and the period for which the recognition speech is inputted into the microphone 17 do not overlap between them. This allows the speech recognition engine 12 to correctly make the speech recognition of the recognition speech-data. In contrast, if the user using the speech recognition function utters a recognition speech during the output of the guidance speech (i.e., before the completion of the output of the guidance speech from the speaker 23), the period for which the guidance speech is inputted into the microphone 17, and the period for which the recognition speech is inputted into the microphone 17 unfavorably overlap between them. This produces the period for which co-presence of the guidance speech-data and the recognition speech-data occurs (i.e., the guidance speech-data serves as noise); the speech recognition engine 12 may not correctly make the speech recognition of the recognition speech-data.

Considering such an issue leads to the addition of configuration to the speech recognition apparatus 1 described above. That is, the speech-data line 20, which connects the first SRC circuit 5 and the amplifier 21 therebetween, has a branch line in the middle; the branch is also connected to the second SRC circuit 6. Such configuration permits the guidance speech-data outputted from the first SRC circuit 5 to enter (i.e., be fetched into) not only the amplifier 21 but also the second SRC circuit 6.

The second SRC circuit 6 receives the guidance speech-data outputted from the first SRC circuit 5 via the part of the speech-data line 20 as a reference speech-data (also referred to as REF DATA). Upon receiving the reference speech-data, the second SRC circuit 6 converts the sampling rate of the received reference speech-data from 48 [kHz] into 16 [kHz]. The second SRC circuit 6 outputs the reference speech-data, the sampling rate of which is converted, to the speech driver 8 via the speech-data line 25. That is, the second SRC circuit 6 converts the sampling rate of the reference speech-data into the same rate as the sampling rate of the guidance speech-data that is inputted from the microphone 17 to the recognition core unit 10.

The speech driver 8 receives the reference speech-data from the second SRC circuit 6, and thereby outputs the received reference speech-data to the pronouncing core unit 7 via the speech-data line 26. Upon receiving the reference speech-data from the speech driver 8, the pronouncing core unit 7 outputs the received reference speech-data to the pronouncing core unit 11 via the speech-data line 27. Upon receiving the reference speech-data from the pronouncing core unit 7, the pronouncing core unit 11 outputs the received reference speech-data to the recognition core unit 10 via the speech-data line 28. According to the above configuration, the user's depression of the PTT button 14 starts simultaneously both the output of the guidance speech from the speaker 23 and the input of the reference speech-data to the recognition core unit 10.

Figure 2:
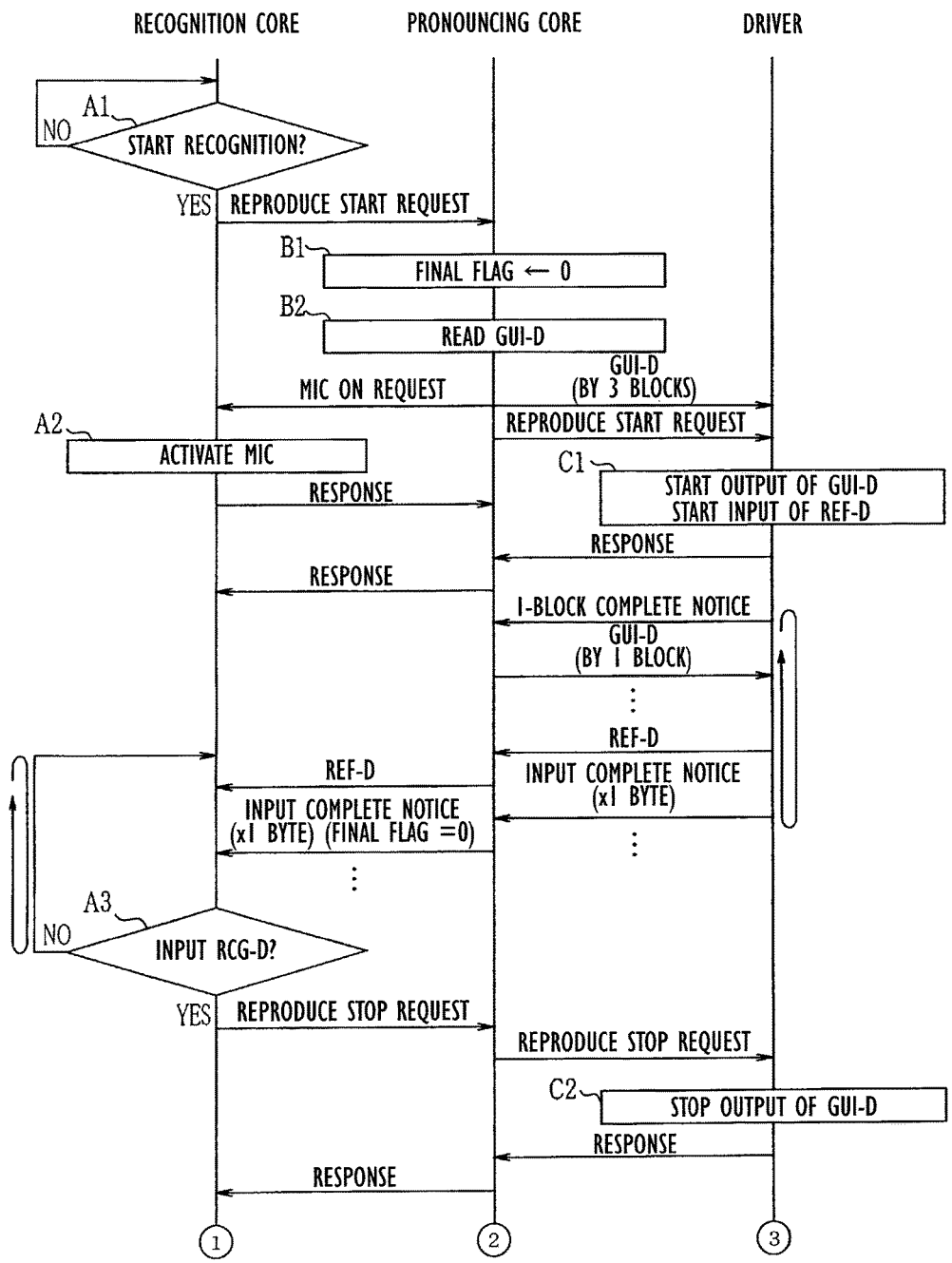
FIG. 2 is a sequence diagram illustrating a process (part 1)
Figure 3:
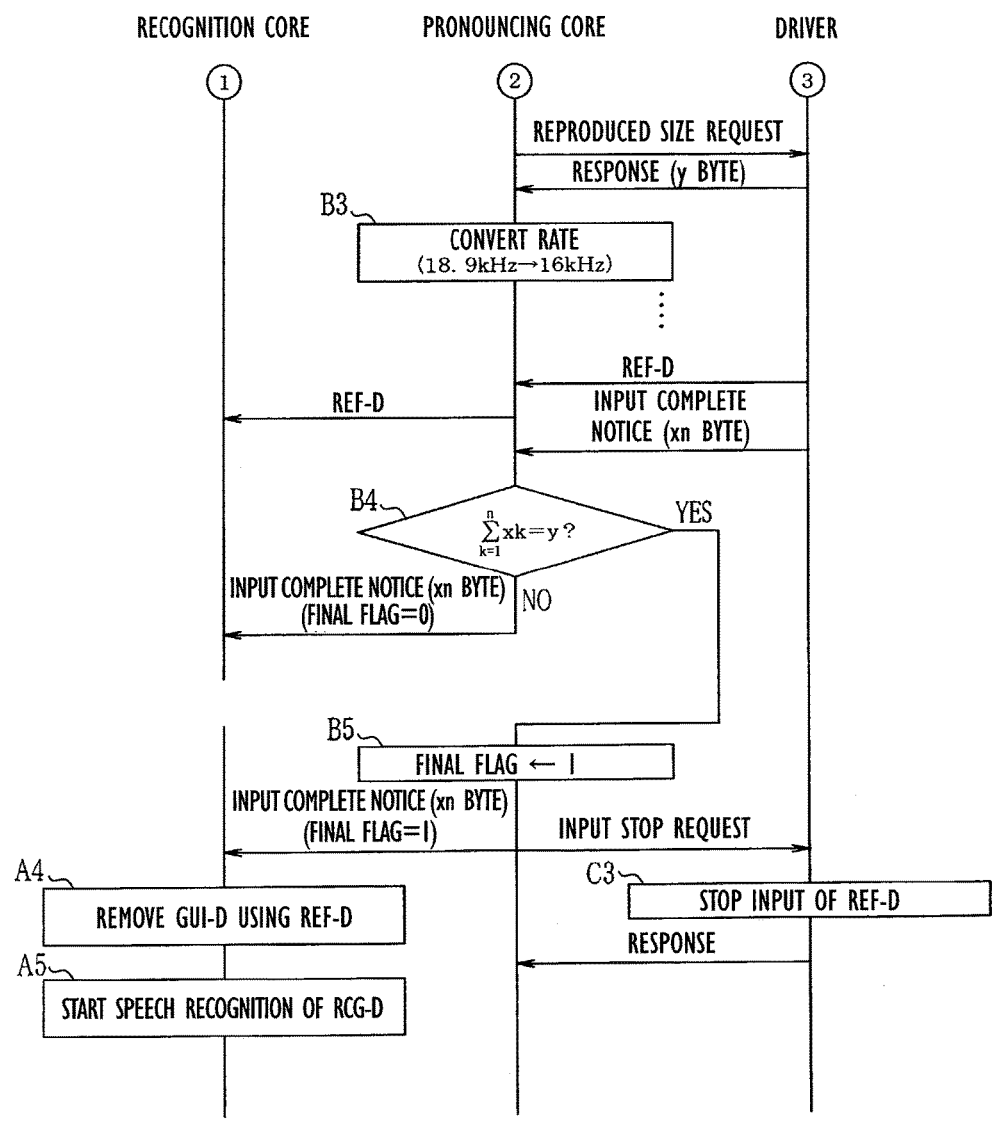
FIG. 3 is a sequence diagram illustrating a process (part 2)
Figure 4B:
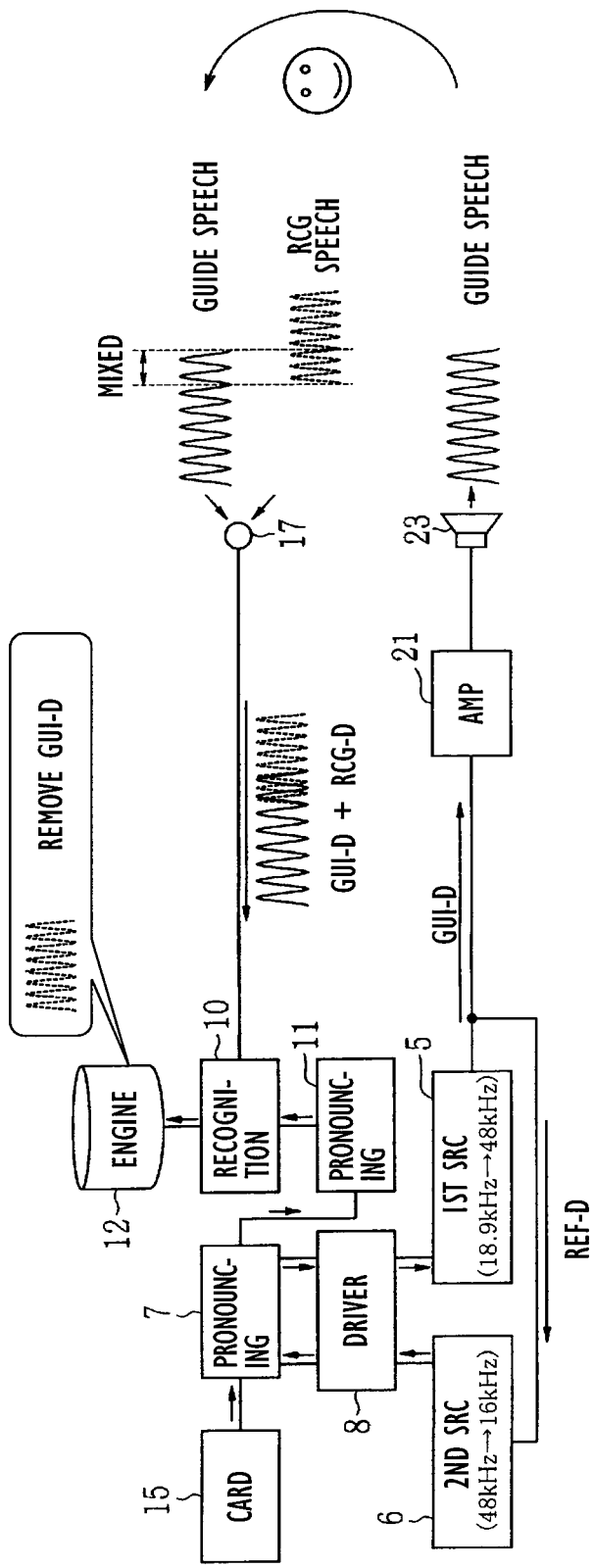
FIG. 4B is a diagram illustrating a present embodiment which removes a guidance speech-data.

The following explains operations in the present embodiment with reference to FIGS. 2 to 4.

It is noted that a process of a flowchart or sequence in the present application includes sections (also referred to as steps), which are represented, for instance, as A1, B1, C1. Further, each section can be divided into several subsections while several sections can be combined into a single section. Furthermore, each of thus configured sections can be also referred to as a device, module, or means. Furthermore, each or some combinations of thus configured sections can be achieved not only (i) as a software section in combination with a hardware unit (e.g., computer), but also (ii) as a hardware section, including or not including a function of a related apparatus. Furthermore, the hardware section can be constructed inside of a microcomputer.

The pronouncing core unit 7 can store a final flag. The recognition core unit 10 receives a detection signal from the PTT button 14, and thereby determines that a user starts a speech recognition function (A1: YES), then outputting a reproduction start request to the pronouncing core unit 7 via the control line 13. Upon receiving the reproduction start request from the recognition core unit 10, the pronouncing core unit 7 sets the final flag to "0" (B1) and reads out a guidance speech-data from the SD card 15 (B2). The pronouncing core unit 7 then outputs the read guidance speech-data (by three blocks, one block being, e.g., 32 k bytes) to the speech driver 8 via the speech-data line 16, and subsequently outputs the reproduction start request to the speech driver 8. At the same time of outputting the read guidance speech-data to the speech driver 8 via the speech-data line 16, the pronouncing core unit 7 outputs a microphone ON request to the recognition core unit 10 via the control line 13. Upon receiving the microphone ON request, the recognition core unit 10 outputs an activation signal to the microphone 17. The microphone 17 is thereby activated so as to then wait for an input (sound collection) of a speech to be uttered by the user (A2). Following activating the microphone 17, the recognition core unit 10 outputs a microphone ON response to the pronouncing core unit 7 via the control line 13.

When receiving (i) the guidance speech-data (by three blocks) and then (ii) the reproduction start request from the pronouncing core unit 7, the speech driver 8 starts simultaneously the output of the guidance speech-data and the input of the reference speech (C1). Thus, the start of outputting the guidance speech-data by the speech driver 8 causes the guidance speech-data to undergone conversion and amplification. That is, (i) the sampling rate of the guidance speech-data is converted from 18.9 [kHz] into 48 [kHz] with the first SRC circuit 5, (ii) the guidance speech-data is then amplified according to the predetermined amplification rate with the amplifier 21, and (iii) the guidance speech-data is converted into the guidance speech (audible sound) with the speaker 23. This starts the output of the guidance speech from the speaker 23. Simultaneously with the above, the guidance speech-data outputted from the first SRC circuit 5 is inputted (i.e., fetched into) to the second SRC circuit 6 as a reference speech-data. The sampling rate of the reference speech-data inputted into the second SRC circuit 6 is converted, e.g., from 48 [kHz] to 16 [kHz] by the second SRC circuit 6; the reference speech-data having undergone the conversion in respect of the sampling rate is inputted to the recognition core unit 10 via the speech driver 8, the pronouncing core unit 7, and the pronouncing core unit 11. As a result, at the same time when the output of the guidance speech from the speaker 23 is started, the input of the reference speech-data to the recognition core unit 10 is started.

When starting simultaneously the output of the guidance speech-data and the input of the reference speech, the speech driver 8 outputs a reproduction start response to the pronouncing core unit 7. Upon receiving the reproduction start response from the speech driver 8, the pronouncing core unit 7 outputs the reproduction start response to the recognition core unit 10 via the control line 13.

Moreover, after starting the output of the guidance speech-data, the speech driver 8 outputs a one-block regeneration completion notice to the pronouncing core unit 7 each time completing the output of one block of the guidance speech-data. Each time receiving the one-block regeneration completion notice from the speech driver 8, the pronouncing core unit 7 outputs the guidance speech-data (by one block) to the speech driver 8 via the speech-data line 16. Each time receiving the reference speech-data following starting of the input of the reference speech-data, the speech driver 8 outputs the received reference speech-data to the pronouncing core unit 7 via the speech-data line 26. The speech driver 8 then outputs the input completion notice indicating the size (xn (n=natural number 1, 2, 3, . . . ) bytes) of the reference speech-data the input of which are completed.

Upon receiving the reference speech-data from the speech driver 8, the pronouncing core unit 7 outputs the received reference speech-data to the recognition core unit 10 (through the pronouncing core unit 11) via the speech-data lines 27 and 28. The recognition core unit 10 thus receives the reference speech-data (to execute first procedure). Moreover, at a subject time when receiving the input completion notice from the speech driver 8, the pronouncing core unit 7 outputs the input completion notice including the final flag set at the subject time to the recognition core unit 10 via the control line 13. The pronouncing core unit 7, which sets the final flag to "0" at the subject time, notifies the recognition core unit 10 of the final flag being set to "0."

The following explains the case where the user utters a recognition speech during the output of the guidance speech from the speaker 23 (before the completion of the output). The user utters a recognition speech and the recognition speech uttered by the user is inputted into the microphone 17. Upon receiving the recognition speech uttered by the user, the microphone 17 converts the received recognition speech into a speech-data, and outputs the recognition speech-data to the recognition core unit 10 via the speech-data line 18. The recognition core unit 10 thereby determines that the recognition speech-data is inputted via the microphone 17 (A3: YES), and outputs a reproduction stop request to the pronouncing core unit 7 via the control line 13. Upon receiving the reproduction stop request from the recognition core unit 10, the pronouncing core unit 7 outputs the reproduction stop request to the speech driver 8.

Upon receiving the reproduction stop request from the pronouncing core unit 7, the speech driver 8 stops the output of the guidance speech-data (C2). As a result, the output of the guidance speech from the speaker 23 is stopped. Following stopping of the output of the guidance speech-data, the speech driver 8 outputs a reproduction stop response to the pronouncing core unit 7. Thus, when the user utters the recognition speech during the output of the guidance speech from the speaker 23, the output of the guidance speech is stopped. This, however, involves an occurrence of a subject period for which the microphone 17 receives simultaneously the guidance speech outputted by the speaker 23 and the recognition speech uttered by the user. That is, the subject period is a period for which both the guidance speech-data and the recognition speech-data are co-existing.

Upon receiving the reproduction stop response from the speech driver 8, the pronouncing core unit 7 outputs the reproduction stop response to the recognition core unit 10 via the control line 13. Subsequently, the pronouncing core unit 7 outputs a reproduced size request to the speech driver 8. Upon receiving the reproduced size request, the speech driver 8 outputs a reproduced size response indicating the size (y bytes) of the guidance speech-data whose reproduction is completed to the pronouncing core unit 7. Upon receiving the reproduced size response from the speech driver 8, the pronouncing core unit 7 converts the sampling rate of the guidance speech-data whose reproduction is completed from 18.9 [kHz] into 16 [kHz], for instance (B3).

The pronouncing core unit 7 subsequently receives the reference speech-data and then the input completion notice from the speech driver 8. The pronouncing core unit 7 then calculates a total of the size of the reference speech-data indicated by the input completion notices received so far (the total of the size of the reference speech-data whose input is completed). The pronouncing core unit 7 then compares the calculated value with the reproduced size indicated by the reproduced size response(s), and thereby determines whether the calculated value reaches the size of the guidance speech-data whose reproduction is completed (B4).

When not determining that the calculated value reaches the size of the guidance speech-data whose reproduction is completed (B4: NO), the pronouncing core unit 7 outputs the input completion notice to the recognition core unit 10 via the control line 13 while continuing setting the final flag to "0." The pronouncing core unit 7 still setting the final flag to "0" notifies the recognition core unit 10 of the final flag being set to "0." The recognition core unit 10 receives the reference speech-data from the pronouncing core unit 7, and subsequently receives the input completion notice; the recognition core unit 10 is notified that the final flag is set to "0" and waits for the input of the input completion notice and the next reference speech-data.

In contrast, when determining that the calculated value reaches the size of the guidance speech-data whose reproduction is completed (B4: YES), the pronouncing core unit 7 sets the final flag to "1" (i.e., changing from "0" to "1") and outputs the input completion notice to the recognition core unit 10 via the control line 13. The pronouncing core unit 7, which has set the final flag to "1," notifies the recognition core unit 10 of the final flag set to "1." The recognition core unit 10 receives the reference speech-data from the pronouncing core unit 7, and subsequently receives the input completion notice. The recognition core unit 10 is thus notified that the final flag is set to "1"; the recognition core unit 10 eliminates the guidance speech-data using the reference speech-data (A4, to execute a second procedure). In more detail, the recognition core unit 10 converts the reference speech-data into the opposite phase, and adds the reference speech-data converted into the opposite phase to the guidance speech-data, offsetting them to thereby remove the guidance speech-data. The recognition core unit 10 then outputs the speech-data after recognition, to the speech recognition engine 12 via the speech-data line 24, causing the speech recognition engine 12 to start the speech recognition of the speech-data after recognition (A5).

Moreover, the pronouncing core unit 7 outputs simultaneously (i) the input stop request to the speech driver 8 and (ii) the input completion notice to the recognition core unit 10 via the control line 13. Upon receiving the input stop request from the pronouncing core unit 7, the speech driver 8 stops the input of the reference speech-data (C3). Following stopping the output of the reference speech-data, the speech driver 8 outputs the input stop response to the pronouncing core unit 7.

The series of processing explained above permits the following. That is, the user utters a recognition speech during the output of the guidance speech from the speaker 23; the period for which both the guidance speech-data and the recognition speech-data are co-existing occurs. However, removing the guidance speech-data using the reference speech-data enables the speech recognition engine 12 to correctly make the speech recognition of the recognition speech-data. That is, a configuration in FIG. 4A, which indicates a comparative example not receiving any reference speech-data, fails to remove the guidance speech-data mixed with the recognition speech-data; the recognition speech-data cannot be correctly recognized. In contrast, the configuration (of the present embodiment) in FIG. 4B receiving the reference speech-data uses the reference speech-data to thereby remove the guidance speech-data mixed with the recognition speech-data; the recognition speech-data can be correctly recognized.

As explained above, according to the speech recognition apparatus 1 of the present embodiment, the guidance speech-data before being converted into the guidance speech is used as a reference speech-data. Even when the guidance speech outputted from the speaker 23 inputted into the microphone 17, the guidance speech-data into which the guidance speech is converted is removed using the reference speech-data. This configuration does not need another microphone in addition to the microphone 17 that receives the recognition speech uttered by a user, and prevents the decline in the recognition rate of the recognition speech-data even when the recognition speech is uttered by the user while the guidance speech is outputted.

Here, the sampling rate of the reference speech-data is provided to be identical to (accorded with) the sampling rate of the speech-data that is inputted from the microphone 17 to the recognition core unit 10. This configuration can overcome an issue to be assumed due to the disagreement between the sampling rate of the guidance speech-data and the sampling rate of the reference speech-data, and then remove the guidance speech-data using the reference speech-data.

Moreover, the process of removing the guidance speech-data using the reference speech-data is started on the condition that the size of the reference speech-data inputted into the speech driver 8 reaches the size of the guidance speech-data outputted from the speech driver 8. This configuration considers the time difference (i.e., time lag) between the output of the guidance speech-data from the speech driver 8 and the input of the reference speech-data to the speech driver 8, and thereby removes the entity of the guidance speech-data that are outputted from the speech driver 8 using the reference speech-data. This can prevent the occurrence of the state (i.e., failure in removal) where part of the guidance speech-data is not removed.

The present disclosure is not limited only to the above-mentioned embodiments, and can be modified or extended as follows. Without need to be limited to a vehicular speech recognition apparatus, the present disclosure may apply to a speech recognition apparatus for another use. Without need to be limited to a speech for urging utterance of a speech used for a navigation function, the guidance speech may be a speech to urge utterance of a speech used for another function.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A speech recognition apparatus comprising:
a speech input device which receives a speech and converts the speech into a speech-data;
a speech-data input device that receives a speech-data;
a speech recognition device that applies a speech recognition to the speech-data from the speech-data input device;
a guidance speech-data output device that outputs a guidance speech-data;
a speech output device that converts the guidance speech-data outputted from the guidance speech-data output device into a guidance speech, and outputs the guidance speech audibly to guide a user to utter a recognition speech, wherein the recognition speech is then received and converted into a recognition speech-data by the speech input device; and
a sampling rate conversion device configured to convert a sampling rate;
wherein:
when a start of the user's uttering the recognition speech is detected via the speech input device before the guidance speech is completely outputted audibly from the speech output device, the guidance speech-data output device interrupts outputting of the guidance speech-data to result in outputting only a partial guidance speech-data corresponding to part of the guidance speech-data having been outputted before being interrupted;
the speech output device receives the partial guidance speech-data from the guidance speech-data output device and outputs audibly a partial guidance speech corresponding to the partial guidance speech-data and the speech input device receives the partial guidance speech to output an inputted partial guidance speech-data;
the speech-data input device receives the partial guidance speech-data from the guidance speech-data output device as a reference speech-data;
when receiving the recognition speech-data overlapped with the inputted partial guidance speech-data, the speech-data input device performs a removing process that removes the inputted partial guidance speech-data using the reference speech-data corresponding to the partial guidance speech-data received from the guidance speech-data output device in order that the speech recognition device applies the speech recognition;
the sampling rate conversion device converts a first sampling rate of the reference speech-data into a second sampling rate,
the first sampling rate being identical to a sampling rate of the partial guidance speech-data that the speech output device receives,
the second sampling rate being identical to a sampling rate of the recognition speech-data that the speech-data input device receives from the speech input device,
causing the speech-data input device to receive the reference speech-data after the sampling rate is converted from the first sampling rate into the second sampling rate; and
the removing process is started in response to a first size of the reference speech-data received by the speech-data input device via the sampling rate conversion device reaching a second size of the partial guidance speech-data, which is outputted by the guidance speech-data output device and corresponds to the partial guidance speech outputted audibly by the speech output device.

2. A computer program product including a non-transitory storage medium, the medium including instructions that are read by a computer in a control circuit in a speech recognition apparatus, the instructions being executed by the computer,
the speech recognition apparatus including
a speech input device which receives a speech and converts the speech into a speech-data;
a speech-data input device that receives a speech-data;
a speech recognition device that applies a speech recognition to the speech-data from the speech-data input device;
a guidance speech-data output device that outputs a guidance speech-data;
a speech output device that converts the guidance speech-data outputted from the guidance speech-data output device into a guidance speech, and outputs the guidance speech audibly to guide a user to utter a recognition speech, wherein the recognition speech is then received and converted into a recognition speech-data by the speech input device; and
a sampling rate conversion device configured to convert a sampling rate,
wherein:
when a start of user's uttering the recognition speech is detected via the speech input device before the guidance speech is completely outputted audibly from the speech output device, the guidance speech-data output device interrupts outputting of the guidance speech-data to result in outputting only a partial guidance speech-data corresponding to part of the guidance speech-data having been outputted before being interrupted;
the speech output device receives the partial guidance speech-data from the guidance speech-data output device and outputs audibly a partial guidance speech corresponding to the partial guidance speech-data and the speech input device receives the partial guidance speech to output an inputted partial guidance speech-data; and
the sampling rate conversion device converts a first sampling rate of the reference speech-data into a second sampling rate,
the first sampling rate being identical to a sampling rate of the partial guidance speech-data received by the speech output device,
the second sampling rate being identical to a sampling rate of the recognition speech-data that the speech-data input device receives from the speech input device,
causing the speech-data input device to receive the reference speech-data after the sampling rate is converted from the first sampling rate into the second sampling rate;
the instructions comprising:
a first procedure that causes the speech-data input device to receive the partial guidance speech-data from the guidance speech-data output device as a reference speech-data; and
a second procedure that cause the speech-data input device to start a removing process to remove the inputted partial guidance speech-data using the reference speech-data corresponding to the partial guidance speech-data received from the guidance speech-data output device when receiving the recognition speech-data overlapped with the inputted partial guidance speech-data,
the removing process being started in response to a first size of the reference speech-data received by the speech-data input device reaching a second size of the partial guidance speech-data, which is outputted by the guidance speech-data output device and corresponds to the partial guidance speech outputted audibly by the speech output device.

3. A speech recognition apparatus comprising:
an instruction button configured to receive an instruction from a user;
a speaker configured to output a speech based on a speech-data;
a microphone configured to receive a speech to output a speech-data;
a speech driver configured to output a guidance speech-data; and
a control circuit including a speech recognition engine,
the control circuit communicating with each of the instruction button, the microphone, and the speech driver, while
the speech driver communicating with the speaker,
wherein:
(I-a) based on a recognition start instruction from the user via the instruction button, the control circuit outputs a reproduction start request;
(I-b) based on the reproduction start request, the speech driver starts
 (i) a first output of a guidance speech-data to the speaker, and
 (ii) a second output of the guidance speech-data as a reference speech-data to the control circuit; and
(I-c) based on the first output, the speaker starts speaking a guidance speech at a first point of time and the microphone starts outputting a received guidance speech-data,
wherein:
(II-a) at an uttered point of time after the first point of time, the user utters a recognition speech and the microphone outputs a recognition speech-data;
(II-b) based on the recognition speech-data, the control circuit outputs a reproduction stop request to the speech driver;
(II-c) based on the reproduction stop request, the speech driver interrupts
 (i) the first output of the guidance speech-data to the speaker and
 (ii) the second output of the guidance speech-data as the reference speech-data to the control circuit, resulting in outputting only a partial guidance speech-data, as a partial reference speech-data, corresponding to part of the guidance speech-data having been outputted before being interrupted; and
(II-d) based on interrupting the first output,
the speaker stops outputting the guidance speech at a second point of time being later by a time lag from the uttered point of time, resulting in speaking only a partial guidance speech corresponding to the partial guidance speech-data,
while the microphone results in outputting a received partial guidance speech-data corresponding to the partial guidance speech which is partially overlapped with the recognition speech-data due to the time lag,
wherein
(III) the control circuit performs a removing process to remove the received partial guidance speech-data using the partial reference speech-data corresponding to the partial guidance speech-data received from the speech driver in order that the speech recognition engine applies a speech recognition, in response to a first size of the partial reference speech-data corresponding to the partial guidance speech-data received by the control circuit being determined to have reached a second size of the partial guidance speech-data, which is outputted by the speech driver and corresponds to the partial guidance speech outputted audibly by the speaker.

4. The speech recognition apparatus according to claim 3, further comprising:
a sampling rate conversion device configured to perform a conversion of a first sampling rate of the reference speech-data into a second sampling rate, causing the control circuit to receive the reference speech-data having the second sampling rate,
the first sampling rate being identical to a sampling rate of the partial guidance speech-data that the speaker receives,
the second sampling rate being identical to a sampling rate of the speech-data that the control unit receives from the microphone,
wherein
(III) the control circuit performs the removing process, in response to that the first size of the partial reference speech-data corresponding to the partial guidance speech-data received by the control circuit via the sampling rate conversion device is determined to have reached the second size of the partial guidance speech-data, which is outputted by the speech driver and corresponds to the partial guidance speech outputted audibly by the speaker.

5. The speech recognition apparatus according to claim 3, wherein
the second size of the partial guidance speech-data is outputted by the speech driver when the speech driver interrupts each of the first output of the guidance speech-data and the second output of the guidance speech-data.

6. The speech recognition apparatus according to claim 4, wherein
the second size of the partial guidance speech-data is outputted by the speech driver when the speech driver interrupts each of the first output of the guidance speech-data and the second output of the guidance speech-data.

7. The speech recognition apparatus according to claim 1, wherein
the second size of the partial guidance speech-data is outputted by the guidance speech-data output device when the guidance speech-data output device interrupts outputting of the guidance speech-data.

\* \* \* \* \*